United States Patent

Bateman

[11] 4,209,608
[45] Jun. 24, 1980

[54] ADDUCTS CONTAINING EPOXIDE GROUPS, FROM HYDANTOIN POLYEPOXIDE AND BINUCLEAR HYDANTOIN COMPOUNDS

[75] Inventor: John H. Bateman, Bardonia, N.Y.

[73] Assignee: Ciba-Geigy Corporation, Ardsley, N.Y.

[21] Appl. No.: 968,150

[22] Filed: Dec. 11, 1978

[51] Int. Cl.$^2$ .................. C08G 59/02; C08G 59/26
[52] U.S. Cl. ..................... 528/363; 260/18 PN; 528/117; 528/367; 528/310
[58] Field of Search .................. 528/367, 363, 117; 260/830 P, 18 PN, 830 S, 834, 835

[56] References Cited

U.S. PATENT DOCUMENTS

| | | | |
|---|---|---|---|
| 3,779,949 | 12/1973 | Porret et al. | 260/2 N |
| 3,799,894 | 3/1974 | Porret et al. | 260/2 EP |
| 4,071,477 | 1/1978 | Seltzer et al. | 260/2 N |

*Primary Examiner*—Earl A. Nielsen
*Attorney, Agent, or Firm*—Joseph F. DiPrima

[57] ABSTRACT

An advanced addition product containing 1,2-epoxide groups is prepared from the reaction of a hydantoin diglycidyl compound of the formula

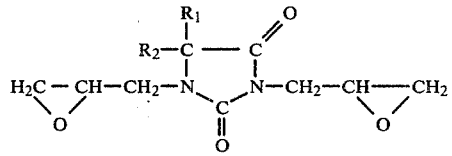

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms, with less than 1 equivalent of NH groups per epoxide group of the diglycidyl compound of a binuclear bishydantoin compound of the formula

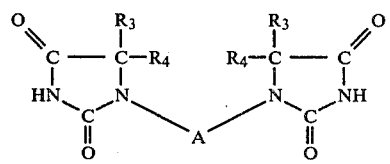

wherein $R_3$ and $R_4$ are selected from the group consisting of hydrogen or alkyl of 1 to 4 carbon atoms; or together $R_1$ and $R_2$ form tetramethylene or pentamethylene, and A is a member selected from the group consisting of alkylene, alkylidene or alkylidene substituted by one or more halogen atoms.

Such adducts exhibit superior melt-flow characteristics and, when formulated into a thermosettable coating composition, exhibit excellent weathering and overcure properties.

8 Claims, No Drawings

ADDUCTS CONTAINING EPOXIDE GROUPS, FROM HYDANTOIN POLYEPOXIDE AND BINUCLEAR HYDANTOIN COMPOUNDS

BACKGROUND OF THE INVENTION

The so-called "advancement" of relatively low molecular weight, low-melting or liquid epoxide resins, by reaction with polyfunctional compounds of which the functional groups react with epoxide groups, to give higher molecular, weight, higher melting epoxide resins, is known. Such an advancement is intended to improve or modify, in the desired direction, the technical processing properties for certain end uses. For some end uses, for example in sintering powders, compression molding powders, an increase in the softening point or melting point can be be desirable. The advancement produces, in parallel to the increase in size of the molecule, a lowering of the epoxide group content per kilogram of resin, and hence a reduction in the reactivity. This has an advantageous effect, for example when using the product as a casting and impregnating resin, in that the shrinkage or reaction becomes less and reduces the danger of cavity formations, especially in the case of larger castings.

Epoxide resins of relatively high molecular weight, and corresponding lower epoxide content, can be manufactured in a single step, by using a smaller stoichiometric excess of epichlorohydrin than is used in the manufacture of polyglycidyl ethers. An example of this is the condensation of epichlorohydrin with a polyhydric phenol, such as diomethane [2,2-bis(p-hydrophenyl)-propane], in the presence of an alkali. This process, however, suffers from the disadvantage that the sodium chloride produced during the condensation is difficult to wash out of the solid epoxide resins thus obtained. Furthermore the products, are as a rule, very inhomogeneous in their composition, and contain major proportions of branched or partially crosslinked products. The disadvantages described above can be avoided, to a large extent, by manufacturing, in a first stage, low molecular liquid polyglycidyl ethers which are of relatively homogeneous composition and from which sodium chloride and excess alkali can easily be washed out, and subjecting the products thus obtained to a controlled advancement reaction in a second stage. Such processes are, for example, described in U.S. Pat. Nos. 2,615,008 and 3,006,892. In these, dihydric phenols, such as diomethane, dicarboxylic acids, or their anhydrides, are primarily used for the advancement.

When using dicarboxylic acids or dicarboxylic acid anhydrides the storage stability of the advanced epoxide resins is frequently inadequate, because these compounds are active cross-linking agents or curing agents for the epoxide resins, and because crosslinking reactions with free hydroxyl groups of the epoxide resin are possible even when less than stoichiometric amounts are used. Diphenols, in the advancement which has been preferred in industry, do not decrease storage stability. However, a serious disadvantage of the incorporation of the aromatic ring structure of the diphenol into the molecule of the advanced epoxide resin has an adverse affect on electrical properties, particularly tracking resistance and arcing resistance. Such resins tend to form carbon-containing tracks during electrical discharges and are therefore not as well suited to high voltage technology.

This disadvantage is particularly serious in the case of the advancement of relatively low molecular weight epoxide resins which themselves do not contain any aromatic rings, for example glycidyl esters of hydroaromatic dicarboxylic acids, such as tetrahydrophthalic and hexahydrophthalic acid, cycloaliphatic polyepoxides of which the epoxide groups are present in the cyclopentane or cyclohexane rings, or heterocyclic nitrogen-containing glycidyl compounds such as N,N'-diglycidyl-5,5-dimethylhydantoin.

These non-aromatic epoxide resins are, as a rule, distinguished by particularly good electrical properties. In contrast to the polyglycidyl ethers of polyphenols, the chain length and the epoxide content of these non-aromatic epoxide resins cannot be varied within wide limits within the framework of a single-stage process. This can only be achieved by a two-stage process, or a advancement reaction.

If a diphenol is used for the advancement, then the original outstanding electrical properties of the non-aromatic epoxide resins, such as the arcing resistance and tracking resistance, are decisively worsened as a result of the incorporation of aromatic rings into the resin molecule.

U.S. Pat. No. 3,799,894 teaches that instead of diphenols or dicarboxylic acids, certain binuclear N-heterocyclic compounds containing one endocyclic NH group in each nucleus, and in particular, bis(hydantoin) compounds or bis(dihydrouracil) compounds, can be employed for the advancement. The epoxide resins which have been advanced with the aid of such nitrogen bases show both good storage stability and excellent electrical properties. In the case of the advancement of non-aromatic epoxide resins, the good electrical properties are fully preserved. It also proves possible to improve the electrical properties of relatively low molecular weight polyglycidyl ethers of polyphenols by the advancement with the above-mentioned heterocyclic nitrogen compounds.

This reference further teaches that the non-aromatic epoxide resins employed therein may be N,N'-diglycidyl compounds of formula

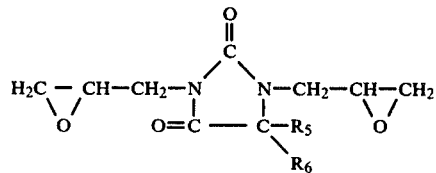

wherein $R_5$ and $R_6$ each denote a hydrogen atom or a lower alkyl residue having 1 to 4 carbon atoms or wherein $R_5$ and $R_6$ together form a tetramethylene or pentamethylene residue.

Representative of this class of compounds are for example:
1,3-diglycidyl-hydantoin
1,3-diglycidyl-5-methyl-hydantoin
1,3-diglycidyl-5-n-propyl-hydantoin
1,3-diglycidyl-5-methyl-5-ethyl-hydantoin
1,3-diglycidyl-1,3-diazaspiro(4,5)decane-2,4-dione
1,3-diglycidyl-2,3-diazaspiro(4,4)nonane-2,4-dione.

The preferred embodiments of this reference include 1,3-diglycidyl-5,5-dimethylhydantoin and 1,3-diglycidyl-5-isopropylhydantoin as the N-heterocyclic polyepoxide.

U.S. Pat. No. 4,071,477 discloses hydantoin diglycidyl compounds of the formula

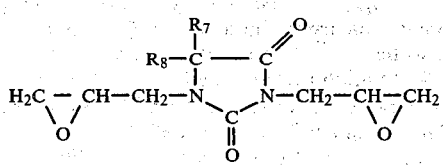

wherein $R_7$ is hydrogen, alkyl containing 1 to 8 carbon atoms or cycloalkyl containing 5 to 6 carbon atoms, and $R_8$ is alkyl containing 5 to 8 carbon atoms or cycloalkyl containing 5 to 6 carbon atoms.

This reference teaches that these liquid diglycidyl compounds are easily processable as casting and laminating resins, and, when cured, possess excellent resistance to water absorption.

It is already known from U.S. Pat. Nos. 2,947,725 and 2,940,953 the reaction of diepoxides, such as diglycidyl ethers of dialcohols or diphenols or their mixtures with monoepoxide, with cyanuric acid can produce polyepoxide compounds of higher molecular weight. Because of the trifunctionality of the cyanuric acid, only branched polyepoxides can be produced. Since cyanuric acid also acts as a crosslinking curing agent for epoxide resins, the manufacture of higher molecular epoxide resins which are still soluble and fusible is a delicate undertaking; partially crosslinked or gelled products, which are industrially unusable, are easily produced.

DETAILED DESCRIPTION OF THE INVENTION

The subject of the present invention is an advanced addition product containing 1,2-epoxide groups, which is prepared by reacting a mixture of (a) a hydantoin diglycidyl compound of the formula

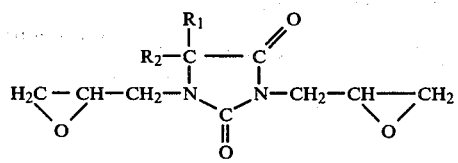

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms, and (b) less than 1 equivalent of NH groups per epoxide group of diglycidyl compound (a) of a binuclear bis-hydantoin compound of the formula

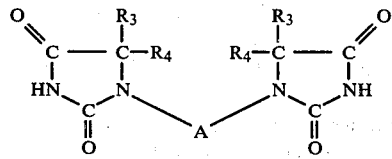

wherein $R_3$ and $R_4$ are selected from the group consisting of hydrogen or alkyl of 1 to 4 carbon atoms; or together $R_3$ and $R_4$ form tetramethylene or pentamethylene, and A is selected from the group consisting of alkylene, alkylidene or alkylidene substituted by one or more halogen atoms.

The intermediate hydantoin of the formula

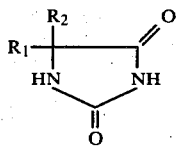

can be prepared by the well-known method of using a given ketone, sodium cyanide and ammonium carbonate. The diglycidyl hydantoin compound of this invention can then be prepared in the usual way using epichlorohydrin, tetramethylammonium chloride (TMAC) and alkali, e.g.,

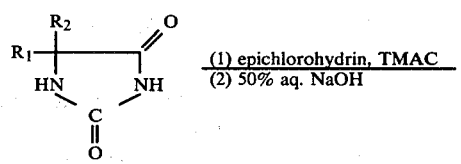

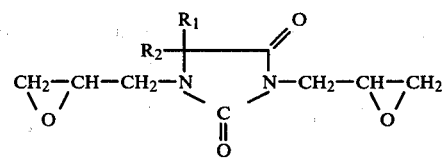

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms.

The alkyl group employed herein includes both straight- and branched-chain alkyl groups, examples of which are methyl, ethyl, propyl, isopropyl, butyl, neopentyl, amyl, sec-amyl, isoamyl, hexyl, octyl and the like. The cycloalkyl groups include cyclopentyl and cyclohexyl.

Preferably, $R_1$ is hydrogen, alkyl containing 1 to 8 carbon atoms; and $R_2$ is alkyl containing 5 to 8 carbon atoms.

Most preferably, $R_1$ is alkyl containing 1 to 6 carbon atoms and $R_2$ is alkyl containing 5 to 6 carbon atoms.

The binuclear bis-hydantoin employed to advance said hydantoin diglycidyl compound is of the following formula

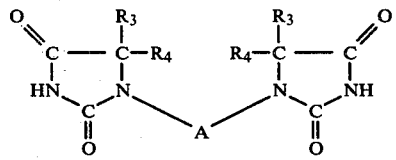

wherein $R_3$ and $R_4$ are selected from the group consisting of hydrogen or alkyl of 1 to 4 carbon atoms; or together $R_3$ and $R_4$ form tetramethylene or pentamethylene, and A is a member selected from the group consisting of alkylene, alkylidene or alkylidene substituted by one or more atoms.

Preferably, $R_3$ and $R_4$ are selected from the group consisting of alkyl of 1 to 4 carbon atoms; and A is an alkylene group of 1 to 7 carbon atoms.

Most preferably, $R_3$ and $R_4$ are selected from the group consisting of alkyl of 1 to 2 carbon atoms; and A is methylene. group of 1 carbon atom.

Binuclear bis-hydantoins of the above formula wherein A is a methylene group may be prepared in high yield by condensing two moles of a hydantoin of the formula

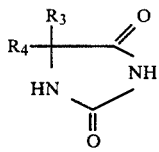

wherein $R_3$ and $R_4$ are defined as above, with formaldehyde under acidic conditions in the presence of a metal halide catalyst if necessary.

Binuclear bis-hydantoins of the above formula wherein A is an alkylidene group of the formula

wherein $R''$ is alkyl or halo-substituted alkyl each containing 1 to 2 carbon atoms may be prepared according to the method described in U.S. Pat. No. 3,225,060.

Binuclear bis-hydantoins of the above formula wherein A is an alkylene group which contains more than one carbon atom may be prepared by condensing two moles of a hydantoin of the formula

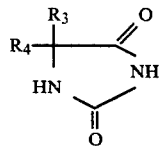

wherein $R_3$ and $R_4$ are defined above with a bis-acetal of the formula

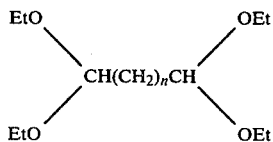

wherein n is 1 to 5, under anhydrous conditions followed by hydrogenation of the unsaturated intermediate.

It is a major objective of this invention to provide resins with outstanding resistance to weathering. Surprisingly, it has been found that the objects of this invention have markedly superior weathering properties to prior art advanced hydantoin epoxies. This is especially evident in coating applications.

Surprisingly, it has also been found that the objects of this invention, when formulated into heat curable coating compositions, display much improved "overbake resistance." Thus, if an uncured, coated part is inadvertently left in a curing oven beyond the recommended time, there is less of a tendency for the coating to discolor or deteriorate in some other manner when the objects of this invention are used.

The objects of this invention are more hydrophobic than prior art hydantoin epoxy resins. Thus, coatings derived from the object of this invention are more resistant to the action of water or high humidity.

In electrostatic spraying applications, the resin is blended with appropriate hardeners, pigments, and modifiers and applied as a dry powder. The coating is then heated to melt and cure the resin. The resin must remain in a fluid state long enough to fuse and coalesce with neighboring particles in order for a complete cure to be obtained and that a smooth appearance is imparted to the coating. If the viscosity of the melt is too high, the surface of the cured coating will be uneven, resulting in poor appearance or a non-coherent coating. It is an object of this invention to produce advanced epoxy resins with superior melt-flow characteristics to those described in U.S. Pat. No. 3,799,894. A convenient way of measuring the melt-flow properties of an advanced epoxy resin is to take viscosity readings at elevated temperature near the curing temperature but without the resin in contact with the curing agent. Resins with lower melt viscosities generally have better flow and melting characteristics. It will be demonstrated in the examples that the objects of this invention have improved melt-flow properties over the prior art advanced hydantoin epoxy resins.

The new adducts of the invention are, as a rule, manufactured by heating the hydantoin diepoxide compound with the binuclear hydantoin compound and, in particular, in the temperature range of 100°–200° C. Not more than 0.9 equivalent of NH group of the binuclear hydantoin compound is used per 1 equivalent of epoxide group. The reaction can be accelerated by adding suitable catalysts. Such catalysts are for example alkali hydroxides such as sodium hydroxide or alkali halides such as lithium chloride, potassium chloride and sodium chloride, bromide or fluoride; tertiary amines such as triethylamine, tri-n-propylamine, benzyldimethylamine, N,N'-dimethylaniline and triethanolamine; quaternary ammonium hydroxides such as benzyltrimethylammonium hydroxide; quaternary ammonium salts such as tetramethylammonium chloride, tetraethylammonium chloride, benzyltrimethylammonium chloride, benzyltrimethylammonium acetate or methyl-triethylammonium chloride; hydrazines having a tertiary nitrogen atom, such as 1,1-dimethylhydrazine, which can also be employed in the quaternized form.

Depending on the choice of the starting substances the reaction takes place, quantitatively, so rapidly that no addition of catalyst is necessary. Whilst the starting substances are, as a rule, mixed with one another at room temperature and then brought to the reaction temperature, it is advantageous in the case of very reactive components for the polyepoxide compound to be heated by itself to the requisite reaction temperature and the other reaction components then gradually added. The progress of the reaction can be followed by titration of the epoxide groups using samples taken during the reaction; the end product will contain a defined, constant epoxide group content.

The new advanced addition products obtained according to the process of the invention are mostly solid at room temperature; their softening points as a rule lie between 40° and 140° C.; the color of these resin-like adducts varies from colorless glass-clear through yellow to brown.

Because of their content of free epoxide groups, these advanced adducts react with the usual curing agents for epoxide compounds, and can therefore be crosslinked or cured by adding such curing agents, analogously to other polyfunctional epoxide compounds, or epoxide resins. Possible curing agents of this kind are basic or acid compounds.

As suitable curing agents, there may for example be mentioned: amines or amides such as aliphatic, cycloaliphatic or aromatic primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4-amino-3-methyl-cyclohexyl)methane, 2,2-bis(4-aminocyclohexyl)propane, 3,5,5-trimethyl-3-(aminomethyl)-cyclohexylamine ("isophoronediamine"), N-aminoethyl-piperazine, Mannich bases, such as 2,4,6-tris(dimethylaminomethyl)phenol; m-phenylenediamine, p-phenylenediamine, bis(p-aminophenyl)methane, bis(p-aminophenyl)sulphone and m-xylylenediamine; adducts of acrylonitrile or monoepoxides such as ethylene oxide or propylene oxide, to polyalkylenepolyamines such as diethylenetriamine or triethylenetetramine; adducts of polyamines such as excess diethylenetriamine or triethylenetetramine, and polyepoxides such as diomethane polyglycidyl ethers; ketamine, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine and dimerized or trimerized unsaturated fatty acids such as dimerized linseed oil fatty acid ("Versamid"); polymeric polysulphides ("Thiokol"); dicyanamide; aniline-formaldehyde resins; polyhydric phenols, for example resorcinol, 2,2-bis(4-hydroxyphenyl)propane or phenol-formaldehyde resins; boron trifluoride and its complexes with organic compounds, such as $BF_3$-ether complexes and $BF_3$-amine complexes for example $BF_3$-monoethylamine complex; acetoacetanilide-$BF_3$ complex; phosphoric acid, triphenylphosphite; polybasic carboxylic acids and their anhydrides for example phthalic anhydride, tetrahydrophthalic anhydrides, for example phthalic anhydride, tetrahydrophthalic anhydride, hexahydrophthalic anhydride, 4-methylhexahydrophthalic anhydride, 3,6-endomethylene-tetrahydrophthalic anhydride, methyl-3,6-endomethylenetetrahydrophthalic anhydride (=methylnadicanhydride) 3,4,5,6,7,7-hexachlor-3,6-endomethylene-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

It is particularly advantageous to use curing agents which, in themselves, yield moulding materials of good electrical properties, such as cycloaliphatic dicarboxylic acid anhydrides; for example, $\Delta^4$-tetrahydrophthalic anhydride or hexahydrophthalic anhydride, or cycloaliphatic polyamines, such as 2,2-bis(4-aminocyclohexyl)propane or "isophorone-diamine."

It is also possible to use cure accelerators during the cure, and in particular when using polyamides, polymeric polysulphides, dicyandiamide or polycarboxylic acid anhydrides as curing agents; such accelerators are, for example, tertiary amines, their salts or quaternary ammonium compounds, for example, 2,4,6-tris(dimethylaminomethyl)phenol, benzyldimethylamines, 2-ethyl-4-methyl-imidazole or triamylammonium phenolate; or alkali metal alcoholates, such as sodium hexanetriolate.

The expression "cure," as used herein, denotes the conversion of the above adducts, containing epoxide groups, into insoluble and infusible crosslinked products, as a rule with simultaneous shaping to give shaped articles such as castings, presings or laminates, or to give two-dimensional structures such as coatings, lacquer films or adhesive bonds.

If desired, it is possible to add to the advanced adducts, containing epoxide groups according to the invention, active diluents such as for example styrene oxide, butylglycidyl ether, isooctylglycidyl ether, phenylglycidyl ether, cresylglycidyl ether or glycidyl esters of synthetic highly branched mainly tertiary aliphatic monocarboxylic acids ("Cardura E"), or cycloaliphatic monoepoxides such as 3-vinyl-2,4-dioxaspiro(5,5)-9,10-epoxy-undecane.

The adducts according to the invention can furthermore be used mixed with other curable diepoxide or polyepoxide compounds. As such there may for example be mentioned: polyglycidyl ethers of polyhydric alcohols such as 1,4-butanediol, polyethylene glycols, poypropylene glycols or 2,2-bis-(4'-hydroxyclcohexyl)-propane; polyglycidyl ethers or polyhydric phenols, such as 2,2-bis-(4'-hydroxyphenyl)propane (=diomethane),
2,2-bis-(4'-hydroxy-3,',5'-dibromophenyl)propane
bis-(4-hydroxyphenyl)sulphone,
1,1,2,2-tetrakis-(4-hydroxyphenyl)ethane or condensation products of formaldehyde with phenols produced in an acid medium, such as phenol novolacs or cresol novolacs; polyglycidyl esters of polycarboxylic acids such as, for example, phthalic acid giglycidyl ester, or hexahydrophthalic acid diglycidyl ester; triglycidyl isocyanurate, N,N'-diglycidyl-5,5-dimethylhydantoin, or aminopolyepoxides such as are obtained by dehydrohalogenation of the reaction products of epihalogenohydrin, and primary or secondary amines such as aniline or 4,4'-diaminodiphenylmethane; also alicyclic compounds containing several epoxide groups, such as vinylcyclohexene-diepoxide,
dicyclopentadienediepoxide,
ethylene glycol-bis-(3,4-epoxytetrahydrodicyclopentadiene-8-yl)-ether,
(3,4-epoxycyclohexylmethyl)-3,4-epoxycyclohexanecarboxylate,
(3,4-epoxy-6-methylcyclohexylmethyl)-3,4-epoxy-6-methylcyclohexanecarboxylate,
bis(cyclopentyl)ether diepoxide or
3-(3-4-epoxycyclohexyl)-2,4-dioxaspiro-(5,5)-9,10-epoxy-undecane.

The subject of the present invention, therefore, includes curable mixtures which are suitable for the manufacture of shaped articles, including two-dimensional structures, and which contain the advanced adducts containing epoxide groups according to the invention, optionally together with other diepoxide or polyepoxide compounds and also curing agents for epoxide resins such as polyamines or polycarboxylic acid anhydrides.

The adducts according to the invention, or their mixtures with other polyepoxide compounds and/or curing agents, can furthermore be mixed, at any stage before cure, with usual modifiers such as extenders, fillers and reinforcing agents, pigments, dyestuffs, organic solvents, plasticizers and the like.

As extenders, reinforcing agents, fillers and pigments which can be employed in the curable mixtures according to the invention there may, for example, be mentioned: coal tar, bitumen, glass fibres, boron fibres, carbon fibres, cellulose, polyethylene powder, polypropylene powder, mica, asbestos, quartz powder, gypsum, antimony trioxide, bentones, silica aerogel ("Aerosil"), lithopone, barite, titanium dioxide, carbon black, graphite, iron oxide or metal powder such as aluminum powder or iron powder.

The following are for example suitable as organic solvents for modifying the curable mixtures: toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols may for example be employed as plasticizers for modifying the curable mixtures.

Especially for use in the lacquer field, the new adducts containing epoxide groups can be partially or completely esterified in a known manner with carboxylic acids, such as especially higher unsaturated fatty acids. It is furthermore possible to add other curable synthetic resins, for example phenoplastics or aminoplastics, to such lacquer resin foundations.

It is also possible to add other usual additives, for example, flameproofing agents, agents for conferring thioxtropy, flow control agents such as silicones, cellulose acetobutyrate polyvinyl butyral, waxes, stearates and the like (which are in part also used as mould release agents) to the curable mixtures.

The curable mixtures can be manufactured in the usual manner with the aid of known mixing equipment (stirrers, kneaders, rollers and the like).

The curable epoxide resin mixtures are especially useful in the fields of surface protection, the electrical industry, laminating processes and the building industry. They can be used in a formulation which is in each case suited to the particular end use, in the unfilled or filled state, optionally in the form of solutions or emulsions, as paints, lacquers, sintering powders, compression moulding compositions, dipping resins, casting resins, injection moulding formulations, impregnating resins and adhesives, as tool resins, laminating resins, sealing and filling compositions, floor covering compositions and binders for mineral aggregates.

A main field of application lies in the field of compression moulding powders and of sintering powders. Here, the epoxide resins powder mixtures can be processed without pressure or with pressure, according to known processes such as fluidized bed sintering, electrostatic fluidized bed sintering, spraying, electrostatic spraying, compression moulding and the like.

In the examples which follow, unless otherwise stated, parts denote parts by weight and percentages denote percentages by weight. The relationship of the parts by volume to the parts by weight is as that of the milliliter to the gram.

EXAMPLE 1

Preparation of
1,3-diglycidyl-5-sec-amyl-5-ethylhydantoin

A mixture of 5-sec-amyl-5-ethylhydantoin (397 parts), epichlorohydrin (1575 parts) and tetramethylammonium chloride (10 parts) was heated slowly to 80° C. over a period of one hour and maintained at 80° C. for 2.5 hours. The reaction mixture was cooled to 60° C. and a reflux was established by reducing pressure. Fifty percent aqueous sodium hydroxide (416 parts) was added dropwise over 2.5 hours while water was removed azetropically by a circulatory distillation. The reaction mixture was cooled to 40° C., filtered, and the filter cake washed with additional epichlorohydrin (500 parts). The filtrate was treated with activated charcoal (2 parts) and filtered through a pad of filter aid. The filtrate was concentrated to near dryness to yield the crude resin. The resin was diluted with chloroform (2000 parts) and washed with water (1000 parts). The organic phase was dried with magnesium sulfate (250 parts), filtered and concentrated to dryness to afford 584 parts (94% yield) of 1,3-diglycidyl-5-sec-amyl-5-ethylhydantoin as a pale yellow resin; epoxy value of 6.18 eq/kg (96% of theory), Cl, 0.75%.

EXAMPLE 2

The following resins were also prepared following the above procedure:

| Resin | Yield | Epoxy Value (% Theory) | % Cl |
|---|---|---|---|
| 1,3-diglycidyl-5-amyl-5-methylhydantoin | 100% | 6.70 eq/kg (99%) | 0.80 |
| 1,3-diglycidyl-5-i-amyl-5-methylhydantoin | 93% | 6.51 eq/kg (97%) | 0.65 |
| 1,3-diglycidyl-5-n-hexyl-5-methylhydantoin | 90% | 6.33 eq/kg (98%) | 0.61 |
| 1,3-diglycidyl-5-amyl hydantoin | 96% | 5.91 eq/kg (86%) | 0.77 |

EXAMPLE 3

In a similar manner, by substituting the appropriate hydantoin for the 5-sec-amyl-5-ethylhydantoin in Example 1, the following diglycidyl hydantoin compounds are obtained:

1,3-diglycidyl-5-ethyl-5-hexylhydantoin
1,3-diglycidyl-5-octylhydantoin
1,3-diglycidyl-5-heptyl-5-methylhydantoin
1,3-diglycidyl-5-amyl-5-octylhydantoin
1,3-diglycidyl-5,5-di-n-octylhydantoin

EXAMPLE 4

For comparison purposes the following hydantoin epoxy resin was prepared, 1,3-diglycidyl-5,5-dimethylhydantoin.

A reaction flask was charged with 961 parts 5,5-dimethylhydantoin, 6937 parts epichlorohydrin and 37.5 parts tetramethylammonium chloride. The mixture was slowly heated, and at 50° solution occured, accompanied by an exotherm. The heating mantle was dropped as soon as the exotherm started, and the temperature reached 83°. After cooling to 70°, the reaction was maintained at this temperature for 2 hours. It was then cooled to 60° and water aspiration vacuum (90–110 mm) was applied to establish reflux.

Reflux temperature was 53°. While refluxing, 1560 parts 50% aqueous NaOH was added dropwise over a 5½ hour priod, maintaining the temperature at 49°–53°. Water was removed and epichlorohydrin returned to the reaction flask by means of a circulatory distillation apparatus. After the addition was complete, reflux was maintained for 1 hour to remove the remaining water. The reaction mixture was then cooled to 25° C. and filtered. The residue (NaCl) was washed with 1 liter of epichlorohydrin and 2 liters of chloroform.

The washings were combined with the filtrate and filtered through a bed of anhydrous NgSO4. The resulting filtrate was then stripped to dryness using a rotoevaporator at 60° and water aspirator vacuum followed by heating at 60°/0.5 mm to constant weight to afford 1200 parts (67% yield) of a water white liquid resin; epoxy value 7.47 eg/kg (96% of theory) chlorine content, 0.78%.

EXAMPLE 5

Using a similar procedure, the following hydantoin epoxy resins were prepared:

| Resin | Yield | Epoxy Value (% Theory) | % Cl |
|---|---|---|---|
| 1,3-diglycidyl-5-ethyl-5-methylhydantoin | 87% | 7.18 eq/kg (91%) | 0.42 |
| 1,3-diglycidyl-5,5-pentamethylenehydantoin | 97% | 6.82 eq/kg (96%) | 0.39 |

EXAMPLE 6

1,3-Diglycidyl-5-sec-amyl-5-ethylhydantoin advanced with 1,1'-methylenebis(5,5-dimethylhydantoin)

1,3-diglycidyl-5-sec-amyl-5-ethylhydantoin (30.00 parts), epoxy value, 6.21 eq/kg was charged to a resin flask and the flask immersed in a preheated 175° oil bath. The resin was stirred for 10 minutes to achieve thermal equilibration. Finely ground 1,1'-methylenebis-(5,5-dimethylhydantoin), 15.37 parts, was then added to the stirring resin, through a funnel, over a period of seventy-five minutes. The addition was made portionwise and the reaction mixture was allowed to clear after each portion before adding the next. The reaction was continued an additional sixty minutes at 175° C. to complete the advancement. The finished material was poured hot onto an aluminum sheet, allowed to cool, broken up and stored. The product was a clear, almost colorless, brittle solid at room temperature, epoxy value, 1.60 eg/kg (101% of theory), and melted 90°–103° C. (Resin No. 1). Using a similar procedure, the same two materials were reacted at a 3:2 equivalent ratio (excess of epoxy) to afford a brittle solid, melting point 98°–119° C. with an epoxy value of 1.30 eq/kg (98% theory) (Resin No. 2).

EXAMPLE 7

1,3-Diglycidyl-5-sec-amyl-5-ethylhydantoin advanced with 1,1'-Methylenebis(5-ethyl-5-methylhydantoin)

1,3-diglycidyl-5-sec-amyl-5-ethyldantoin (30.00 parts, epoxy value 6.21 eq/kg) and 0.15 parts benzyldimethyl amine catalyst were charged to a resin flask and the flask immersed in a preheated 175° C. oil bath. the resin stirred for 10 minutes to achieve thermal equilibration. Finely ground 1,1-methylenebis-(5-ethyl-5-methylhydantoin), 16.88 parts, was then added to the stirring resin, through a funnel, over a period of twenty-five minutes. The mixture was allowed to stir an additional sixty minutes at 175° C. to complete the reaction. The finished material was poured hot onto an aluminum sheet, allowed to cool and solidify, broken up and stored. The product was a clear, nearly colorless brittle solid at room temperature, epoxy value, 1.66 eq/kg (108% of theory) and melted at 78°–92° C. (Resin No. 3).

Using a similar procedure, the same two materials were reacted at 3:2 equivalent ratio (excess of epoxy) to afford a brittle solid, melting point 82°–102° C. with an epoxy value of 1.31 eq/kg (102% theory) (Resin No. 4).

EXAMPLE 8

Advancement of 1,3-diglycidyl-5-ethyl-5-methylhydantoin

Following the procedure described in Example 6, 625.8 parts 1,3-diglycidyl-5-ethyl-5-methylhydantoin (epoxy value, 7.03 eq/kg) was advanced with 437.6 parts 1,1'-methylenebis-(5-ethyl-5-methylhydantoin). The product was a clear yellow brittle solid at room temperature; epoxy value, 1.28 eq/kg (94% theory) and melted 101°–118° C. (Resin No. 5).

Usiing a similar procedure, the same two materials were reacted at different equivalent ratios to afford the following products:

| Resin No. | Ratio (Epoxy/bis-hydantoin) | Melting Point | Epoxy Value (% Theory) |
|---|---|---|---|
| 6 | 13:8 | 89–111° C. | 1.70 eq/kg (100%) |
| 7 | 4:3 | 115–125° C. | 1.05 eq/kg (104%) |

And using 1,1'-methylenebis-(5,5-dimethylhydantoin) as the advancing agent, the following products were obtained:

| Resin No. | Ratio (Epoxy/bis-hydantoin) | Melting Point | Epoxy Value (% Theory) |
|---|---|---|---|
| 8 | 3:2 | 107–120° C. | 1.22 eq/kg (94%) |
| 9 | 4:3 | 115–133° C. | 0.96 eq/kg (91%) |

For comparison purposes, the resins described in Examples 9 and 10 were prepared.

EXAMPLE 9

Advancement of 1,3-diglycidyl-5,5-dimethylhydantoin

Following the procedure in Example 6, the following advanced materials were prepared from 1,3-diglycidyl-5,5-dimethyl-hydantoin and either 1,1'-methylenebis-(5-ethyl-5-methylhydantoin) (bis-MEH) or 1,1'-methylenebis-(5,5-dimethylhydantoin) (bis-DMH):

| Resin No. | Advancing Agent | Ratio (Epoxy/bis-hydantoin | Melting Point | Epoxy Value (% Theory) |
|---|---|---|---|---|
| 10 | bis-MEH | 3:2 | 107–130° C. | 1.33 eq/kg (92%) |
| 11 | bis-DMH | 3:2 | 108–131° C. | 1.47 eq/kg (98%) |

EXAMPLE 10

Advancement of 1,3-diglycidyl-5,5-pentamethylenehydantoin

Follow the procedure described in Example 6, the following advanced materials were prepared from 1,3-diglycidyl-(5,5-pentamethylenehydantoin) and either 1,1'-methylenebis-(5-ethyl-5-methylhydantoin) (bis-MEH) or 1,1'-methylenebis-(5,5-dimethylhydantoin) (bis-DMH).

| Resin No. | Advancing Agent | Ratio (Epoxy/bis-hydantoin) | Melting Point | Epoxy Value (% Theory) |
|---|---|---|---|---|
| 12 | bis-MEH | 2:1 | 85–102° C. | 2.29 eq/kg (103%) |
| 13 | bis-DMH | 2:1 | 100–115° C. | 2.11 eq/kg (90%) |
| 14 | bis-MEH | 3:2 | 135–147° C. | 1.21 eq/kg (90%) |

EXAMPLE 11

Comparison of Melt Viscosities at Constant Advancement Ratio

The following hydantoin epoxy resins, all advanced to the same degree, were subjected to melt viscosity determination using a cone and disc apparatus equipped with a heated stage.

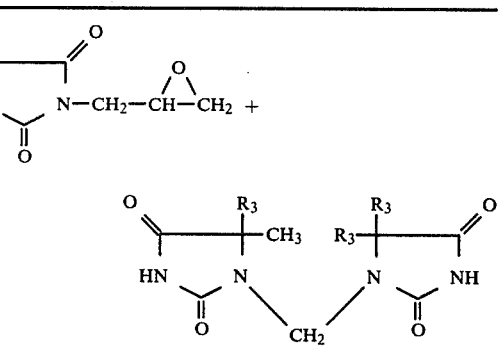

| Resin Number | $R_1$ | $R_2$ | $R_3$ | Ratio | MP | Melt Viscosity |
|---|---|---|---|---|---|---|
| 2 | Et | sec-Am | $CH_3$ | 3:2 | 98–119° C. | 2300 cps/200° C. |
| 4 | Et | sec-Am | Et | 3:2 | 82–102° C. | 1300 cps/200° C. |
| 8 | $CH_3$ | Et | $CH_3$ | 3:2 | 107–120° C. | >4000 cps/200° C. |
| 5 | $CH_3$ | Et | Et | 3:2 | 101–118° C. | >4000 cps/200° C. |
| 10 | $CH_3$ | $CH_3$ | Et | 3:2 | 107–130° C. | >4000 cps/200° C. |
| 14 | $-(CH_2)_5-$ | | Et | 3:2 | 135–147° C. | >4000 cps/200° C. |

EXAMPLE 12

Accelerated Weathering Study

Several advanced hydantoin epoxy resins were formulated into powder coating systems and electrostatically applied to steel testing panels. The panels were then subjected to accelerated weathering in a commercial Weather-O-Meter using a carbon arc light source. Deterioration of the coatings was monitored by measuring the gloss of the coatings (60°) at various intervals. All formulations were made with a binder to pigment ($TiO_2$) weight ratio of 2:1 and cured with Polydride 230, a product of R. T. Vanderbilt Company, East Norwalk, Connecticut, believed to be 2-acetoxyglyceryl di(anhydrotrimellitate), at a resin to curing agent equivalent ratio of 1.0:0.9. The coatings were cured at 204° F. for 10–15 minutes. Results are listed in the following table.

| Hours of Exposure | 60° Gloss Readings | | | |
|---|---|---|---|---|
| | Resin No. 1 | Resin No. 3 | Resin No. 5 | Resin No. 13 |
| 0 | 87 | 88 | 75 | 58 |
| 300 | 90 | 90 | 86 | 61 |
| 500 | 88 | 89 | 75 | 55 |
| 700 | 87 | 85 | 74 | 53 |
| 1000 | 87 | 81 | 50 | 19 |
| 1500 | 86 | 83 | 15 | 9 |
| 2000 | 83 | 81 | — | — |
| 2500 | 75 | 73 | — | — |

Resin No. 1 - 1,3-diglycidyl-5-sec-amyl-5-ethylhydantoin advanced with 1,1'-methylenebis(5,5-dimethylhydantoin)

Resin No. 3 - 1,3-diglycidyl-5-sec-amyl-5-ethylhydantoin advanced with 1,1'-methylenebis(5,5-methylhydantoin)

Resin No. 5 - 1,3-diglycidyl-5-ethyl-5-methylhydantoin advanced with 1,1'-methylenebis(5,5-methylhydantoin Resin No. 13 - 1,3-diglycidyl-5,5-pentamethylenehydantoin advanced with 1,1'-methylenebis(5,5-dimethylhydantoin)

EXAMPLE 13

Overbake Properties.

Electrostatically powder coated panels, similar to those described in Example 12, were tested for overbake properties, i.e., resistance to discoloration upon extended cure at elevated temperature. With an overbake time of 15 minutes at 450° F. coatings based on hydantoin epoxy resins containing alkyl groups greater than $C_4$ showed a change in "b" value of +0.2 to +0.7 units while those coatings based on resins containing only $C_4$ or lower alkyl groups showed changes in "B" value of +0.5 to +3.5. A more positive "b" value means more yellowing and is described fully in ASTM test method D2244-68.

What is claimed is:

1. An advanced addition product containing 1,2-epoxide groups, which is obtained by heating a mixture of (a) a hydantoin diglycidyl compound of the formula

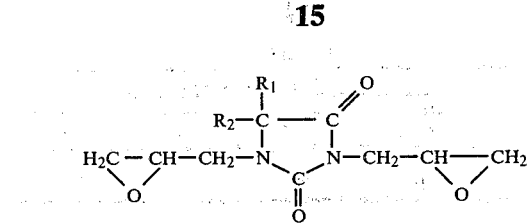

wherein $R_1$ is hydrogen, alkyl containing 1 to 8 carbon atoms or cycloalkyl containing 5 to 6 carbon atoms, and $R_2$ is alkyl containing 5 to 8 carbon atoms or cycloalkyl containing 5 to 6 carbon atoms.

(b) less than 1 equivalent of NH groups per epoxide group of diglycidyl compound (a) of a binuclear bis-hydantoin compound of the formula

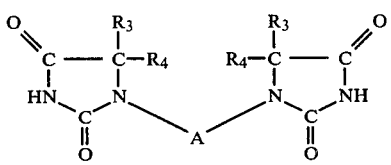

wherein $R_3$ and $R_4$ are selected from the group consisting of hydrogen or alkyl of 1 to 4 carbon atoms; or together $R_3$ and $R_4$ from tetramethylene or pentamethylene, and A is a member selected from the group consisting of alkylene, alkylidene or alkylidene substituted by one or more halogen atoms.

2. An advanced addition product according to claim 1 wherein A is an alkylene group of 1 to 7 carbon atoms; and $R_3$ and $R_4$ are independently alkyl of 1 to 4 carbon atoms.

3. An advanced addition product according to claim 1 wherein A is methylene and $R_3$ and $R_4$ are independently alkyl of 1 to 2 carbon atoms.

4. An advanced addition product according to claims 1 or 3 wherein $R_1$ is hydrogen or alkyl containing 1 to 8 carbon atoms and $R_2$ is alkyl containing 5 to 8 carbon atoms.

5. An advanced addition product according to claims 1 or 3 wherein $R_1$ is alkyl containing 1 to 8 carbon atoms and $R_2$ containing 5 to 6 carbon atoms.

6. An advanced addition product according to claim 1 wherein $R_1$ is ethyl, $R_2$ is sec-amyl; $R_3$ and $R_4$ are methyl; and A is methylene.

7. An advanced addition product according to claim 1 wherein $R_1$ is ethyl; $R_2$ is sec-amyl; $R_3$ is methyl; $R_4$ is ethyl; and A is methylene.

8. A heat curable composition comprising:
(a) an advanced addition product according to claim 1; and
(b) a curing agent selected from the group consisting of polybasic carboxylic acids and polybasic carboxylic acid anhydrides.

* * * * *